US012578211B1

(12) United States Patent
    Simpkins

(10) Patent No.: US 12,578,211 B1
(45) Date of Patent: Mar. 17, 2026

(54) INTELLIGENT WATER METER

(71) Applicant: Larrisha L. Simpkins, Clarksville, TN (US)

(72) Inventor: Larrisha L. Simpkins, Clarksville, TN (US)

( * ) Notice: Subject to any disclaimer, the term of this patent is extended or adjusted under 35 U.S.C. 154(b) by 0 days.

(21) Appl. No.: 17/212,212

(22) Filed: Mar. 25, 2021

(51) Int. Cl.
    *G01D 7/12* (2006.01)
    *G01D 4/00* (2006.01)
    *G01F 1/76* (2006.01)

(52) U.S. Cl.
    CPC .............. *G01D 7/12* (2013.01); *G01D 4/006* (2013.01); *G01F 1/76* (2013.01)

(58) Field of Classification Search
    CPC ............. G01D 7/12; G01D 4/006; G01F 1/76
    USPC ..................................................... 340/870.02
    See application file for complete search history.

(56) References Cited

U.S. PATENT DOCUMENTS

| | | | |
|---|---|---|---|
| 4,099,168 A | 7/1978 | Kedjierski et al. | |
| 4,652,859 A | 3/1987 | Van Wienen | |
| 4,661,804 A | 4/1987 | Abel | |
| 4,811,011 A | 3/1989 | Sollinger | |
| 4,939,504 A | 7/1990 | Miller | |
| 5,335,186 A | 8/1994 | Tarrant | |
| 5,659,300 A | 8/1997 | Dresselhuys et al. | |
| 7,412,876 B2 | 8/2008 | Kates | |
| 8,407,821 B2 | 4/2013 | Chan | |
| 8,554,496 B2 | 10/2013 | Donnelly et al. | |
| 8,847,727 B2 | 9/2014 | Shapiro et al. | |

| | | | |
|---|---|---|---|
| 9,175,979 B2 | 11/2015 | Neri-Badillo | |
| 9,390,381 B2 | 7/2016 | Davari et al. | |
| 9,429,453 B1 | 8/2016 | O'Keeffe et al. | |
| 9,637,895 B2 | 5/2017 | Song et al. | |
| 9,714,503 B2 | 7/2017 | Song et al. | |
| 9,946,271 B2 | 4/2018 | Tuineag et al. | |
| 10,837,160 B2 * | 11/2020 | Hammond .............. E03B 7/072 | |
| 11,047,496 B1 * | 6/2021 | McConnell ............. G01M 3/28 | |
| 11,105,705 B1 * | 8/2021 | Lowitz ................. G05D 7/0641 | |
| 2006/0272830 A1 * | 12/2006 | Fima ..................... G01M 3/186 | |
| | | | 169/16 |

(Continued)

FOREIGN PATENT DOCUMENTS

| | | |
|---|---|---|
| CN | 202854617 U | 4/2013 |
| CN | 202938864 U | 5/2013 |
| CN | 203069225 U | 7/2013 |
| CN | 203191007 U | 9/2013 |
| WO | 2007146121 A2 | 12/2007 |

OTHER PUBLICATIONS

Household intelligent water volume monitoring controller. Patent Translation. Google Patents [retrieved on Mar. 10, 2014]. Retrieved from the Internet: <URL: https://patents.google.com/patent/CN202854617U/en?oq=CN202854617>.

(Continued)

*Primary Examiner* — Quan Zhen Wang
(74) *Attorney, Agent, or Firm* — Cramer Patent & Design, PLLC.; Aaron R. Cramer

(57) ABSTRACT

A water meter is configured to monitor water usage and provide an alert to a user when a faucet is left on, a leak is occurring, or a break has developed. The meter is attachable to a main line to monitor a flow rate of water. If the flow occurs for an extended period of time, a signal is sent to a hand-held remote device, preferably a keychain ornament, that sounds an alarm to the possessor of the remote device.

1 Claim, 5 Drawing Sheets

(56) References Cited

U.S. PATENT DOCUMENTS

| | | | | |
|---|---|---|---|---|
| 2009/0309755 | A1* | 12/2009 | Williamson | G01D 18/006 |
| | | | | 340/870.02 |
| 2011/0178644 | A1* | 7/2011 | Picton | E03B 7/071 |
| | | | | 700/282 |
| 2012/0180877 | A1* | 7/2012 | Pallais | G01K 13/02 |
| | | | | 73/49.1 |
| 2012/0193559 | A1 | 8/2012 | Benson et al. | |
| 2014/0332088 | A1* | 11/2014 | Senesh | F17D 3/01 |
| | | | | 137/115.25 |
| 2017/0030528 | A1* | 2/2017 | Dietzen | G01M 3/2807 |
| 2017/0089047 | A1* | 3/2017 | Kovscek | E03B 7/072 |
| 2017/0364734 | A1* | 12/2017 | Melugin | G06V 20/63 |
| 2019/0234786 | A1* | 8/2019 | Klicpera | G01M 3/26 |
| 2019/0281371 | A1* | 9/2019 | Klicpera | H04Q 9/00 |
| 2019/0323919 | A1* | 10/2019 | Fung-A Wing | G08B 21/20 |
| 2020/0225110 | A1* | 7/2020 | Knauss | G08B 21/182 |
| 2020/0240820 | A1* | 7/2020 | Boerhout | G01N 21/3504 |
| 2021/0079630 | A1* | 3/2021 | Poojary | G01F 1/66 |
| 2021/0140151 | A1* | 5/2021 | Johnson | E03B 7/071 |
| 2021/0316512 | A1* | 10/2021 | Mann, Jr. | B33Y 40/20 |

OTHER PUBLICATIONS

Novel intelligent water meter. Patent Translation. Google Patents [retrieved on Mar. 10, 2014]. Retrieved from the Internet: <URL: https://patents.google.com/patent/CN202938864U/en?oq=CN202938864>.

Intelligent water meter. Patent Translation. Google Patents [retrieved on Mar. 10, 2014]. Retrieved from the Internet: <URL: https://patents.google.com/patent/CN203069225U/en?oq=CN203069225>.

Intelligent water meter based on wireless Zigbee transmission. Patent Translation. Google Patents [retrieved on Mar. 10, 2014]. Retrieved from the Internet: <URL: https://patents.google.com/patent/CN203191007U/en?oq=CN203191007>.

Systems and methods for remote utility metering and meter monitoring. Patent. Google Patents [retrieved on Mar. 10, 2014]. Retrieved from the Internet: <URL: https://patents.google.com/patent/EP2032231A2/en?oq=EP2032231>.

* cited by examiner

INTELLIGENT WATER METER

RELATED APPLICATIONS

Non-applicable.

FIELD OF THE INVENTION

The present invention relates generally to a water meter and more specifically to an intelligent water meter.

BACKGROUND OF THE INVENTION

Utility usage and especially water consumption continues to grow every day in our country. Recent headlines which depict skyrocketing water rates, sprinkling bans, residential development limitations due to lack of available water and general water shortages are definite signs that we need to reduce our consumption of this precious natural commodities. However, most if not all consumers are "in the dark" on their water usage until the bill arrives and panic sets in as to the high cost.

Typically, some cost saving methods is then put in place, but even then, it is not clear whether dollars or pennies are being saved until the next bill arrives. By then other factors such as weather conditions, changing utility rates, and other factors cloud the picture and the final user is still clueless on how to reduce water consumption, save money, and conserve resources. Accordingly, there exists a need for a means by which water usage can be quickly determined, monitored and even controlled. The development of the water usage monitoring, control, and alerting device fulfills this need.

SUMMARY OF THE INVENTION

The principles of the present invention provide for a water usage monitoring, control, and alerting system, has an input connection which is disposed on a water supply line running through the water usage monitoring, control, and alerting system, an output connection which is disposed on the water supply line running through the water usage monitoring, control, and alerting system, an outer enclosure which has a flow rate controller and a usage controller which is disposed on an upper portion of the outer enclosure, a remote wireless computing device interfacing with the water usage monitoring, control, and alerting system, an indicator light illuminated to indicate a plurality of water used to aid in troubleshooting purposes and a first accumulative usage indicator, a second accumulative usage indicator, and a third accumulative usage indicator which are disposed across a bottom of the outer enclosure.

The input connection may be provided on the sides of the outer enclosure to facilitate connection to the water supply line. The output connection may be provided on the sides of the outer enclosure to facilitate connection to the water supply line. The water may flow from the input connection to the output connection along following a water flow path The water in the water flow path may pass through a remote-controlled valve which allows for control of water flow. The water may pass through a mass flow meter which allows for detection of a total mass of water which passes through the water usage monitoring, control, and alerting system. The mass flow meter may allow for calculation of flow rates and usage rates which are displayed and/or controlled via the flow rate controller, the usage controller, the first accumulative usage indicator, the second accumulative usage indicator, and the third accumulative usage indicator.

The flow rate controller may allow an authorized user to control the maximum flow rate of water through the water usage monitoring, control, and alerting system by use of a plurality of first adjustment switches. The usage controller may allow an authorized user to control the maximum amount of water that flows through the water usage monitoring, control, and alerting system before the water is shut-off by a plurality of second adjustment switches.

The remote wireless computing device may also be selected from the group consisting of a smart phone, a tablet computer, or a personal computer. The remote wireless computing device may interface with the water usage monitoring, control, and alerting system through a radio frequency connection selected from the group consisting of Wi-Fi, cellular, or Bluetooth. The remote wireless computing device may allow for remote control and remote monitoring of the water usage monitoring, control, and alerting system without the necessity of being present at the physical location of the water usage monitoring, control, and alerting system.

The first accumulative usage indicator indicates total water usage for a current day, the second accumulative usage indicator indicate total water usage for a current week, and the third accumulative usage indicator indicate total water usage for a current month. The water usage monitoring, control, and alerting system, may also have a reset switch adapted to allow an authorized user to reset the first accumulative usage indicator the second accumulative usage indicator and the third accumulative usage indicator to zero if warranted.

The water usage monitoring, control, and alerting system may also have a recharging port allowing a rechargeable battery which provides power for the water usage monitoring, control, and alerting system. The rechargeable battery may provide electrical power to a main controller. The main controller may be a single board computer and/or may receive an input signal from the mass flow meter, the flow rate controller, the usage controller, the first adjustment switches, the second adjustment switches, and the reset switch. Upon processing, a plurality of output signals may be generated by the main controller for use by the remote-controlled valve, the first accumulative usage indicator, the second accumulative usage indicator, the third accumulative usage indicator, and the indicator light. The water usage monitoring, control, and alerting system may be located downstream from a water service drop, a main shut-off valve, a water meter, and a secondary shut-off valve.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
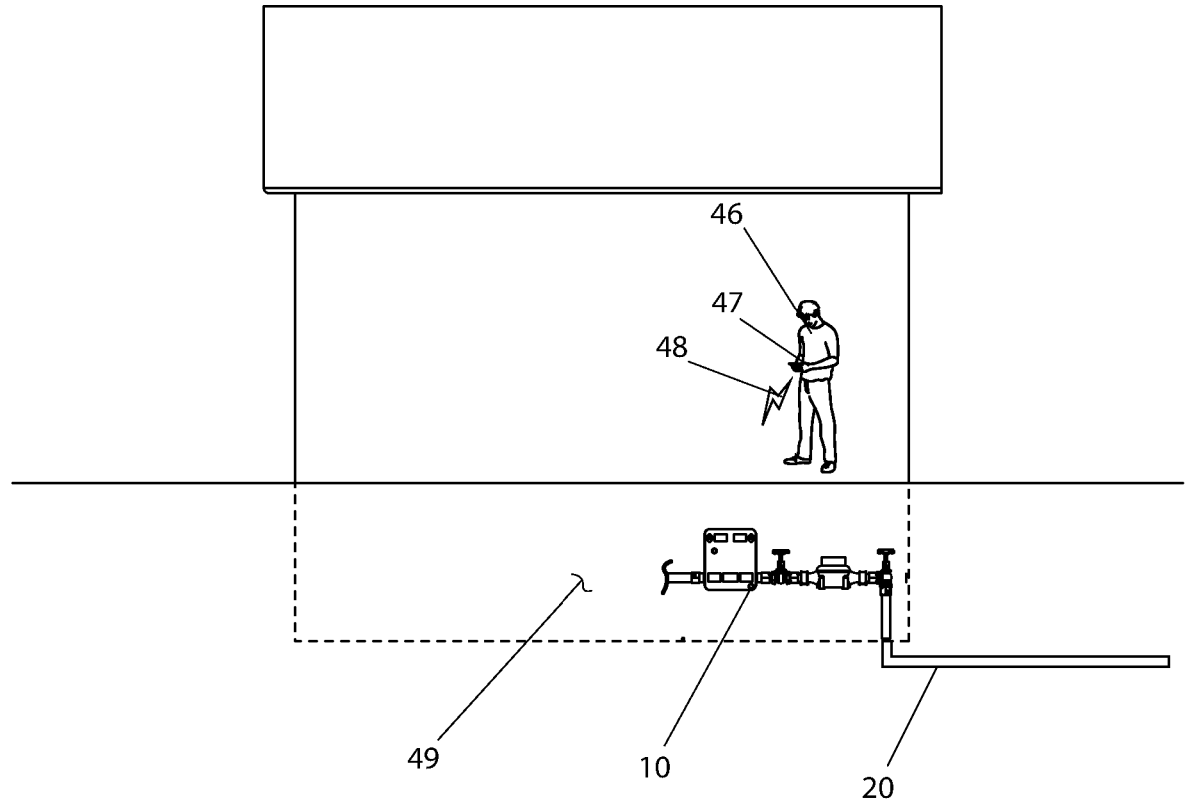
FIG. 1 is an environmental view of the water usage monitoring, control, and alerting system, shown installed in a structure, according to the preferred embodiment of the present invention.

10 water usage monitoring, control, and alerting system
15 water supply line
20 water service drop
25 main shut-off valve
30 water meter
35 secondary shut-off valve
40 input connection
45 output connection
46 user
47 remote wireless computing device
48 radio frequency (RF) connection
49 structure
50 outer enclosure
55 flow rate controller
60 usage controller
65 first adjustment switch
70 second adjustment switch
75 indicator light
80 first accumulative usage indicator
85 second accumulative usage indicator
90 third accumulative usage indicator
95 reset switch
100 recharging port
105 water flow path "a"
110 remote controlled valve
115 mass flow meter
120 rechargeable battery
125 main controller
130 wireless controller

DESCRIPTION OF THE INVENTION

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

DETAILED DESCRIPTION OF THE FIGURES

Referring now to FIG. 1, a perspective view of the water usage monitoring, control, and alerting device 10, according to the preferred embodiment of the present invention is disclosed. The water usage monitoring, control, and alerting system 10 (herein also described as the "system") 10, is installed as an in-line device in a water supply line 15. It is envisioned that the system 10 would be capable of being installed anywhere where water is utilized as a utility with applications in the residential, commercial, institutional and industrial markets.

For purposes of illustration, FIG. 1 depicts the system 10 installed in a main incoming line in a structure 49 resembling a residential setting and as such, is located downstream from a water service drop 20, a main shut-off valve 25, a water meter 30, and a secondary shut-off valve 35. The installation location will provide monitoring, control and alerting capabilities for whole structure 49 usage and as such would be useful for determining total water usage, verification of usage as indicated by the water meter 30, shut-off capabilities when the structure 49 is vacant, emergency shut-off during a pipe break or the like. However, it is noted that other installation locations such as before or after a water heater to verify hot water usage, before an underground sprinkler line to verify irrigation usage, before a branch line to a bathroom, kitchen, or the like to verify usage by room or user 46 in the structure 49 would also be possible. Other structure 49 locations in commercial or institutional establishment such as floors of a building, departmental breakdown, process or utility water feeds or the like are also possible depending on the needs of the user 46. As such, the installation or use of the system 10 in any particular type or location of water supply line 15 is not intended to be a limiting factor of the present invention.

The system 10 is provided with an input connection 40 and an output connection 45. The system 10 is capable of interfacing to a remote wireless computing device 47 such as a smart phone, tablet computer, personal computer or the like, through the use of a radio frequency (RF) connection 48 such as Wi-Fi, cellular, Bluetooth®, or the like. The interface will allow for remote control and remote monitoring of the system 10 without the necessity of being present at the physical location of the system 10.

Figure 2:
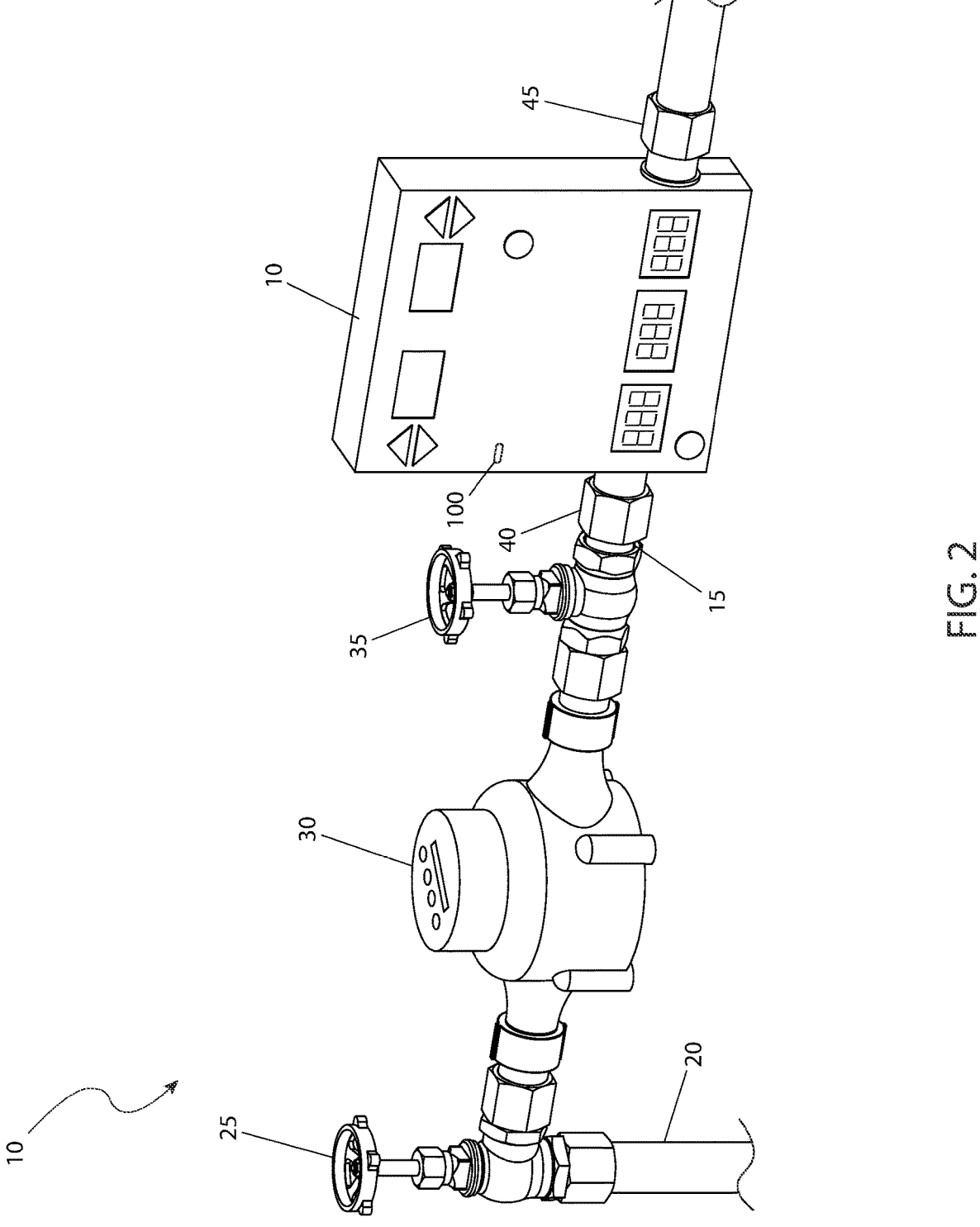
FIG. 2 is a close-up perspective view of the water usage monitoring, control, and alerting system, shown in a utilized state, according to the preferred embodiment of the present invention.

Referring next to FIG. 2, a front view of the system 10, according to the preferred embodiment of the present invention is depicted. The system 10 is provided with an outer enclosure 50 envisioned to be made of impact resistant plastic. The upper portion of the outer enclosure 50 is provided with a flow rate controller 55 and a usage controller 60. The flow rate controller 55 allows an authorized user to control the maximum flow rate of water through the system 10 by use of first adjustment switches 65. The usage controller 60 allows an authorized user to control the maximum amount of water that can flow through the system 10 before the water is shut-off. The maximum amount is controlled by second adjustment switches 70. An indicator light 75 is illuminated as water is being used to aid in troubleshooting purposes. Across the bottom of the outer enclosure 50 is a first accumulative usage indicator 80, a second accumulative usage indicator 85, and a third accumulative usage indicator 90. It is envisioned that the first accumulative usage indicator 80 would indicate total usage in gallons for the current day, the second accumulative usage indicator 85 would indicate total usage in gallons for the current week (or last seven days (7 d.)), and the third accumulative usage indicator 90 would indicate total usage in gallons for the current month (or last thirty days (30 d.)). A reset switch 95 allows the authorized user 46 to reset the first accumulative usage indicator 80 the second accumulative usage indicator 85 and the third accumulative usage indicator 90 to zero (0) should such action be warranted. A recharging port 100 allows a rechargeable battery (not shown due to illustrative limitations) to be recharged which provides power for the internal and external components of the system 10. The input connection 40 and the output connection 45 are provided on the sides of the outer enclosure 50 for easy connection to water supply line 15 (as shown in FIG. 1).

Figure 3:
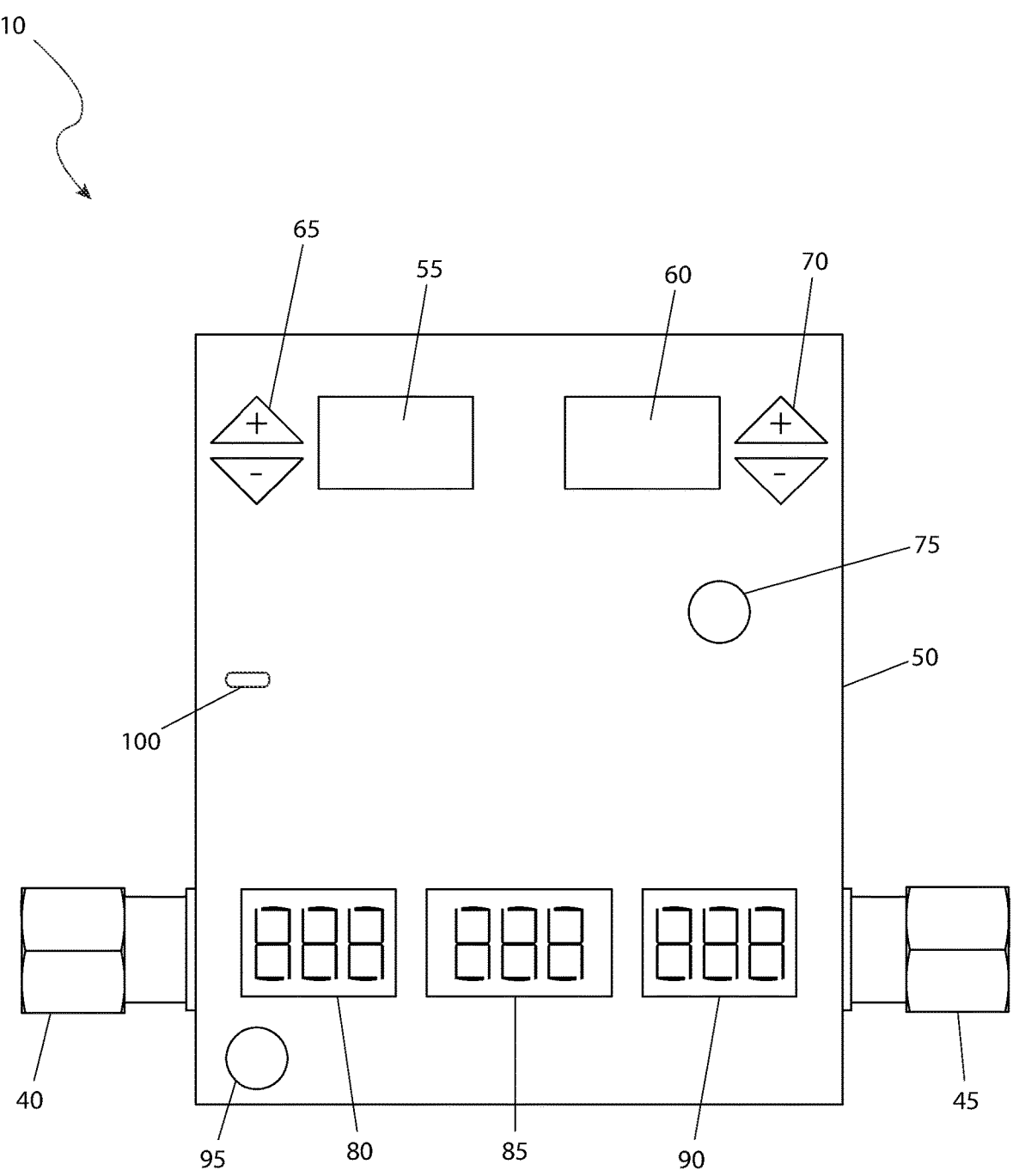
FIG. 3 is a front view of the water usage monitoring, control, and alerting system, according to the preferred embodiment of the present invention.

Referring now to FIG. 3, a mechanical block diagram of the system 10, according to the preferred embodiment of the present invention is shown. Water flows from the input connection 40 to the output connection 45 along following a water flow path "a" 105. Along said path 105, water will pass through a remote-controlled valve 110 which allows for control of water flow. Before exiting the system 10, the water passes through a mass flow meter 115 which allows for detection of the total mass of water which passes through the system 10 at any given time. This allows for calculation of flow rates and usage rates which are displayed and/or controlled via the flow rate controller 55, the usage controller 60, the first accumulative usage indicator 80, the second accumulative usage indicator 85, and the third accumulative usage indicator 90 (all of which are shown in FIG. 2).

Figure 4:
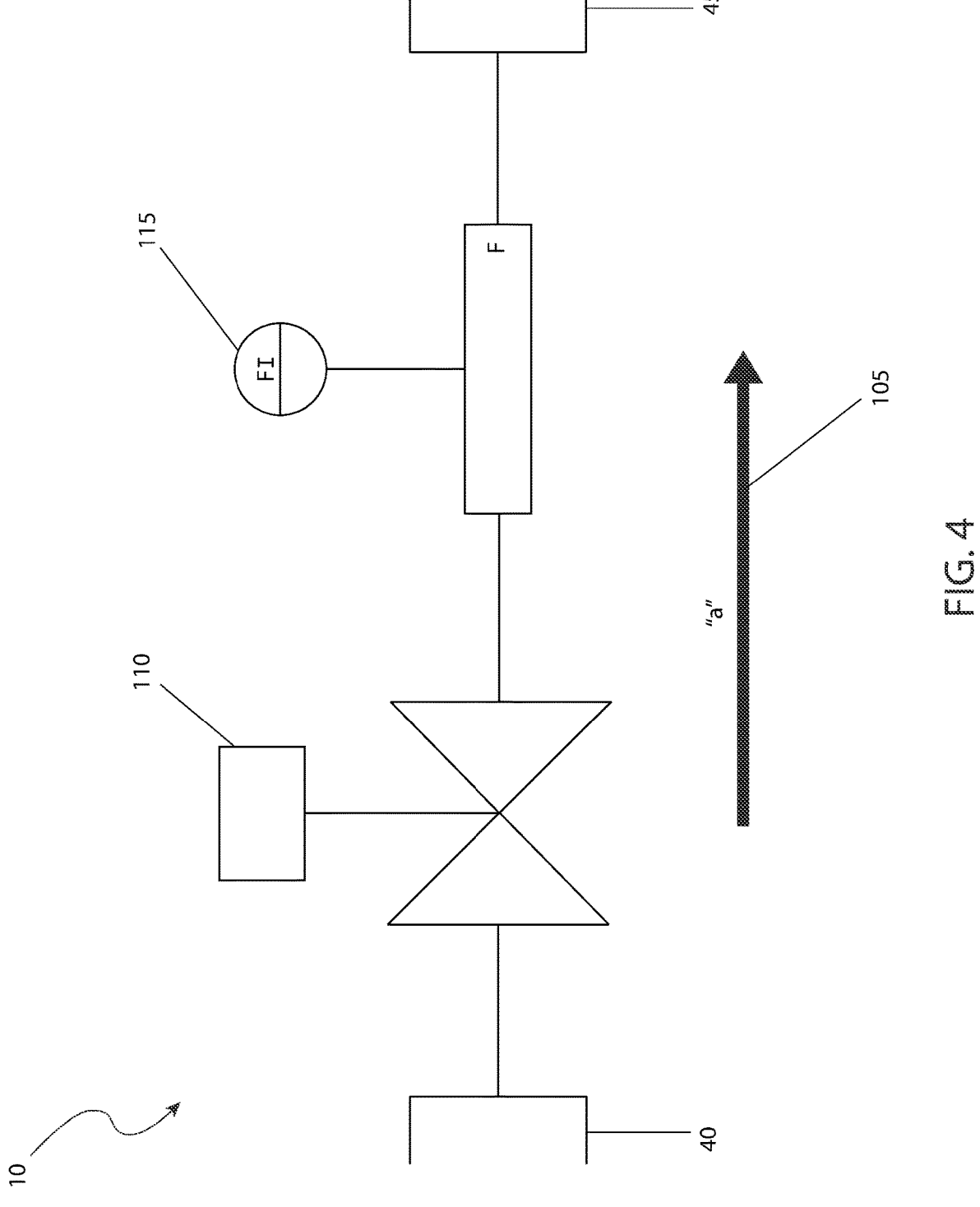
FIG. 4 is a mechanical block diagram of the water usage monitoring, control, and alerting system, according to the preferred embodiment of the present invention.
Figure 5:
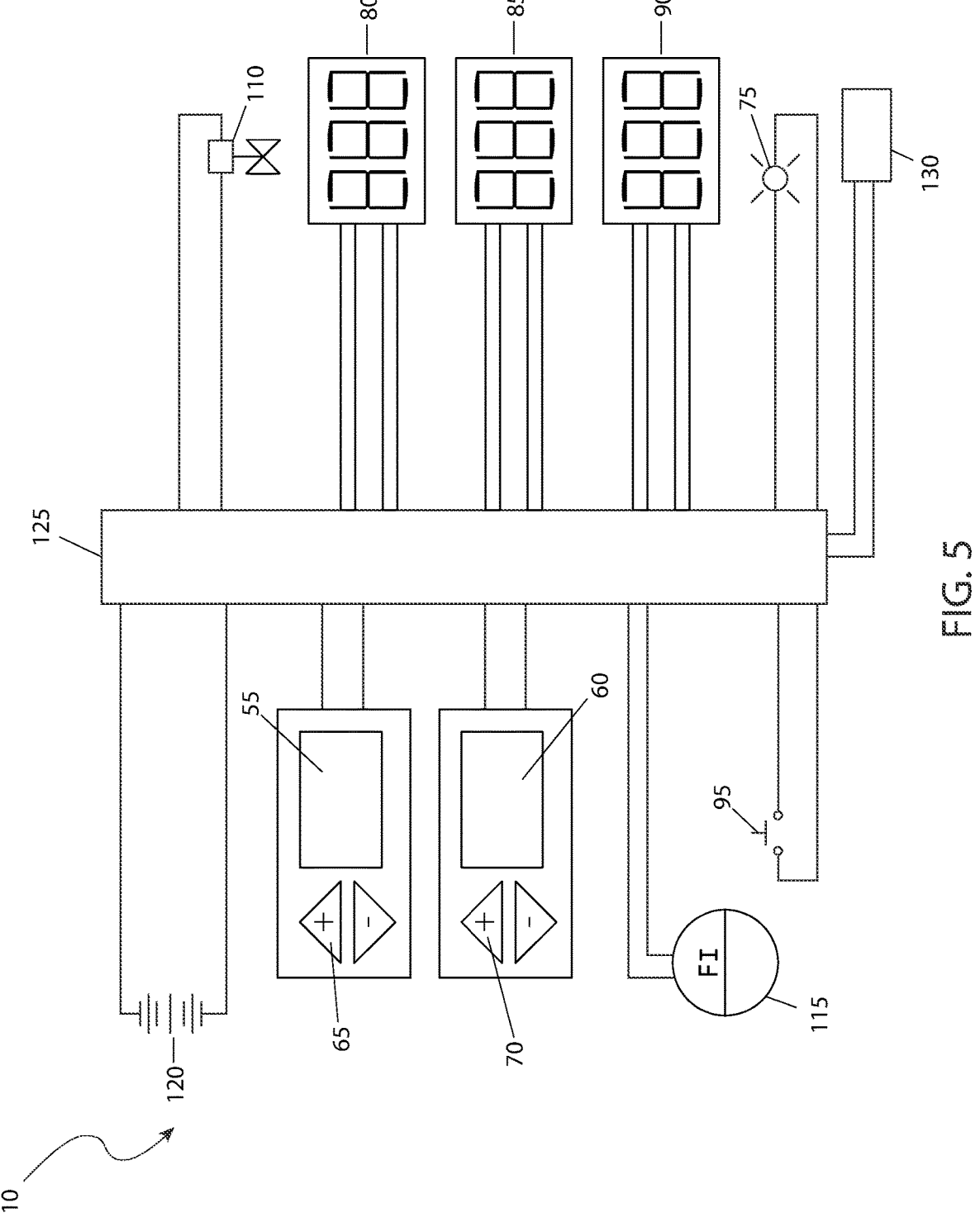
FIG. 5 is an electrical block diagram of the water usage monitoring, control, and alerting system, according to the preferred embodiment of the present invention.

Referring next to FIG. 4, an electrical block diagram of the system 10, according to the preferred embodiment of the present invention is disclosed. Power is provided by a rechargeable battery 120 which provides power to a main controller 125 such as a single board computer (SBC) (Raspberry Pi®, Arduino, or the like). The main controller 125 receives an input signal from the mass flow meter 115, the flow rate controller 55, the usage controller 60, the first adjustment switches 65, the second adjustment switches 70, and the reset switch 95. Upon processing, output signals are generated by the main controller 125 for use by the remote-controlled valve 110, the first accumulative usage indicator 80, the second accumulative usage indicator 85, the third accumulative usage indicator 90, and the indicator light 75. The main controller 125 interfaces to a wireless controller 130 such as a Wi-Fi module, a cellular module, Bluetooth® module or the like, to allow for remote control of the device 10 via a remote wireless computing device 47 (as shown in FIG. 1).

OPERATION OF THE PREFERRED EMBODIMENT

The preferred embodiment of the present invention can be utilized by the common user in a simple and effortless manner with little or no training. It is envisioned that the system 10 would be constructed in general accordance with FIG. 1 through FIG. 4. The user 46 would procure the system 10 from conventional procurement channels such as home improvement stores, electronics suppliers, mail order or internet supply house or the like. Special attention would be paid to the input connection 40 and the output connection 45 to ensure that they are compatible with the water supply line 15 being connected to.

After procurement and prior to utilization, the system 10 would be installed in the following manner: the desired water supply line 15 is shut-off by use of the main shut-off valve 25 or secondary shut-off valve 35, the water supply line 15 is cut and the device 10 inserted using the appropriate connection to the input connection 40 and the output connection 45; the rechargeable battery 120 is sufficiently charged, and if desired, a radio frequency (RF) connection 48 is established.

During utilization of the system 10, the following procedure would be initiated: the authorized user 46 would establish a maximum flow rate by manipulation of the first adjustment switches 65 on the flow rate controller 55, and a maximum usage rate by manipulation of the second adjustment switches 70 on the usage controller 60, water usage would then commence in the usual and customary manner. Should either the flow rate or usage rate over time be exceeded, the system 10 will activate the remote-controlled valve 110 via the main controller 125 to limit or shut-off the flow of water respectively. The user 46 may also monitor the accumulative usage of water over a period of time via the first accumulative usage indicator 80, the second accumulative usage indicator 85, or the third accumulative usage indicator 90.

After use of the system 10 over a period of time, the usage, flow, and accumulative totals may be cleared by usage of the reset switch 95, thus resetting and readying the system 10 for another usage cycle in a cyclical and repeating manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A water usage monitoring, control, and alerting system consisting of:

an outer enclosure;

an input connection and an output connection positioned on opposing sides of the outer enclosure for in-line connection to a water supply line;

a flow rate controller consisting of a plurality of first adjustment switches located on the outer enclosure and configured to set a maximum flow rate;

a usage controller consisting of a plurality of second adjustment switches located on the outer enclosure and configured to set a maximum water usage amount before water flow is shut off;

a mass flow meter disposed along a water flow path between the input connection and the output connection; a remote-controlled valve disposed along the water flow path;

a main controller consisting of a single-board computer housed within the outer enclosure and configured to receive input signals from the mass flow meter, the flow rate controller, and the usage controller and to generate output signals;

a first accumulative usage indicator, a second accumulative usage indicator, and a third accumulative usage indicator disposed on the outer enclosure and configured, respectively, to display total water usage for a current day, a current week, and a current month; a reset switch located on the outer enclosure and configured to reset the first, second, and third accumulative usage indicators to zero;

a rechargeable battery configured to provide power to the main controller and the accumulative usage indicators; and, a wireless controller configured to enable remote monitoring and control of the system via a remote wireless computing device through a radio frequency connection selected from the group consisting of Wi-Fi, cellular, and Bluetooth®; and, wherein the main controller is configured to actuate the remote-controlled valve in response to exceeding either the maximum flow rate set by the flow rate controller or the maximum water usage amount set by the usage controller.

\* \* \* \* \*